May 21, 1940.    A. B. JACOBSON    2,201,267
FISH LURE
Filed March 23, 1939
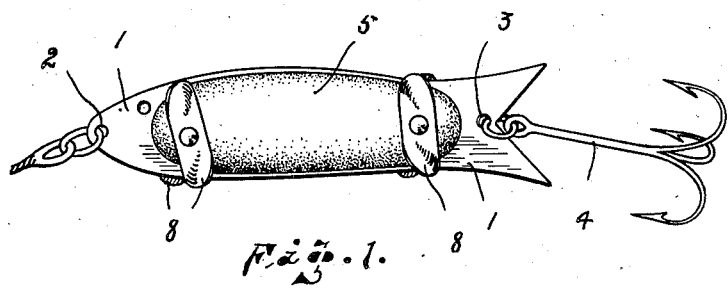
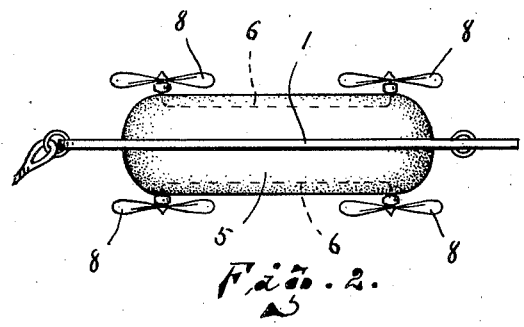
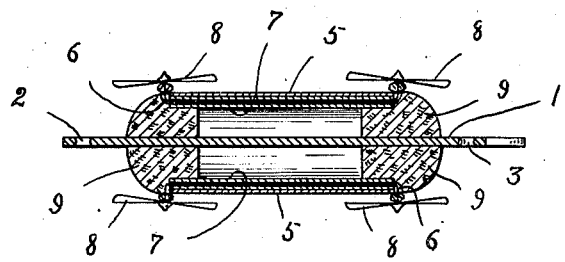
INVENTOR.
Axel B. Jacobson.
BY Geo Stevens.
ATTORNEY.

Patented May 21, 1940

2,201,267

UNITED STATES PATENT OFFICE 2,201,267

FISH LURE

Axel B. Jacobson, Two Harbors, Minn.

Application March 23, 1939, Serial No. 263,731

1 Claim. (Cl. 43—46)

My invention relates to fish lures, or artificial baits and particularly to one designed for use in the art of trolling for fish, though it may be used quite effectively in still fishing, as the operable elements thereon are designed to simulate life in the lure by the least motion of same.

The principal object of the invention is to provide a more attractive and enticing lure than heretofore known.

Other objects and advantages of the invention will appear in the following description thereof.

Referring now to the accompanying drawing, forming part of this application, and wherein like reference characters indicate like parts:

Figure 1 is a side elevation of one embodiment of the invention.

Figure 2 is a partial top plan view of the same.

Figure 3 is a horizontal sectional view to more clearly illustrate the novel construction of the lure.

In the drawing, 1 represents a central principal sustaining member, preferably of sheet metal and made to simulate any creature desired, though preferably that of the side elevation of a minnow, as illustrated, and which is provided at either end with through holes, the one at the head of the minnow indicated at 2 being for attachment of the fishing line and the one at 3 through the tail for the attachment of any desired form of hooks as indicated at 4. A transverse enlarged dimension of the body portion intermediate of the head and tail is accomplished by fixing to either side of the member 1 a substantially half tubular sheet metal member indicated at 5, and this fixing may be accomplished by soldering or the like, the opposite ends of these two members being open when such attachment takes place. However, prior to the attaching of these half tubular members, longitudinally the center of each there is provided a relatively small tube, indicated at 6, which may be soldered thereto and which tube 6 is for the purpose of receiving the journal wire indicated at 7 for the propeller like blades 8, of which there are four, two upon either side of the lure.

With this manner of mounting, it is apparent that the termini of each wire, being bent outwardly and protruding from the body portion, is quite susceptible to vertical oscillatory motion, and, as the ends of each wire carry a freely rotatable sheet metal propeller-like wheel 8, they not only are free to rotate each on its own axis but can flop slightly up or down depending upon the direction of the energy operating same.

The ends of these two half tubes after being attached to the central member 1 may be plugged and rounded off as shown in the drawing, as by cork or the like.

These cork members are indicated at 9 and after being properly positioned as illustrated there results two like chambers within the lure, and which air chambers function as a float for the lure to counteract the weight of the other metal parts thereof as well as the hooks, so that there is no tendency for the lure to sink.

A lure thus equipped upon opposite sides at either end with moving elements such as the propeller like blades which have a marked resemblance to the movement of fins will function admirably as an enticement to a hungry fish.

The simplicity of construction of the lure is believed to be quite marked and novel and which suggests convenient means for the manual construction of same with but slight expense.

Having thus described my invention, what I claim and desire to secure by Letters Patent, is:

A hook-equipped fish lure comprising in combination a relatively thin central supporting member simulating a creature, said member having means for the attachment of a fishing line, laterally extending members upon either side of said central member simulating the body portion of said creature and defining air chambers upon either side of said central member, and rockable and freely rotatable propeller-like blades externally of each of said laterally extending members.

AXEL B. JACOBSON.